(12) United States Patent
Baldoni et al.

(10) Patent No.: US 11,433,533 B2
(45) Date of Patent: *Sep. 6, 2022

(54) KINEMATIC CHAIN FOR TRANSMISSION OF MECHANICAL TORQUES

(71) Applicants: SCUOLA SUPERIORE DI STUDI UNIVERSITARI E DI PERFEZIONAMENTO SANT'ANNA, Pisa (IT); IUVO S.R.L., Pontedera (IT)

(72) Inventors: Andrea Baldoni, Perugia (IT); Francesco Giovacchini, Pisa (IT); Nicola Vitiello, Pontedera (IT)

(73) Assignees: SCUOLA SUPERIORE DI STUDI UNIVERSITARI E DI PERFEZIONAMENTO SANT'ANNA, Pisa (IT); IUVO S.R.L., Pontedera (IT)

( * ) Notice: Subject to any disclaimer, the term of this patent is extended or adjusted under 35 U.S.C. 154(b) by 0 days.

This patent is subject to a terminal disclaimer.

(21) Appl. No.: 17/087,210

(22) Filed: Nov. 2, 2020

(65) Prior Publication Data

US 2021/0046641 A1    Feb. 18, 2021

Related U.S. Application Data

(63) Continuation of application No. 16/308,680, filed as application No. PCT/IB2017/053149 on May 29, 2017, now Pat. No. 10,821,601.

(30) Foreign Application Priority Data

Jun. 14, 2016    (IT) ........................ 102016000061190

(51) Int. Cl.
*B25J 17/00*    (2006.01)
*B25J 17/02*    (2006.01)
(Continued)

(52) U.S. Cl.
CPC ............ *B25J 9/104* (2013.01); *A61H 1/0237* (2013.01); *A61H 1/0262* (2013.01);
(Continued)

(58) Field of Classification Search
CPC .......... B25J 15/0009; B25J 9/104; F16H 7/06
See application file for complete search history.

(56) References Cited

U.S. PATENT DOCUMENTS 3,314,552 A    4/1967 Vertut
3,976,206 A    8/1976 Flatau
(Continued)

FOREIGN PATENT DOCUMENTS

EP    2907467 A1    8/2015
JP    2005349489 A    12/2005
WO    2008131563 A1    11/2008

OTHER PUBLICATIONS

Italian Search Report from IT Application No. IT UA 20164364, dated Feb. 27, 2017.
(Continued)

*Primary Examiner* — Jake Cook
(74) *Attorney, Agent, or Firm* — Workman Nydegger

(57) ABSTRACT

A kinematic chain comprises a first pulley, arranged to rotate about a rotation axis x, and a second pulley arranged to rotate about a rotation axis y. The kinematic chain comprises then at least one connecting element comprising at least one passage having at least one rotating element, said or each connecting element also comprising at least one interface arranged to connect the connecting element to an adjacent connecting element or to a pulley, generating a rotational constraint about a rotation axis z. The kinematic chain also comprises a transmission element arranged to develop along a determined path for transmitting a rotational motion between the first pulley and the second pulley. The trans- (Continued)

mission element is adapted to be, in use, fixedly in contact with said or each rotating element by a constraint of rolling friction, in order to allow a modelling the determined path according to a predetermined geometry.

19 Claims, 8 Drawing Sheets

(51) Int. Cl.
    *B25J 18/00*     (2006.01)
    *B25J 9/10*     (2006.01)
    *A61H 1/02*     (2006.01)
    *B25J 9/00*     (2006.01)
    *F16H 7/06*     (2006.01)

(52) U.S. Cl.
    CPC .......... *A61H 1/0274* (2013.01); *B25J 9/0006* (2013.01); *F16H 7/06* (2013.01); *A61H 2201/1215* (2013.01)

(56) References Cited

U.S. PATENT DOCUMENTS

| | | |
|---|---|---|
| 4,865,376 A | 9/1989 | Leaver et al. |
| 5,062,673 A | 11/1991 | Mimura |
| 5,447,403 A | 9/1995 | Engler, Jr. |
| 5,570,920 A | 11/1996 | Crisman et al. |
| 9,669,551 B1* | 6/2017 | Salisbury ............. B25J 15/0475 |
| 2006/0131908 A1 | 6/2006 | Tadano |
| 2008/0278105 A1 | 11/2008 | Somes |

OTHER PUBLICATIONS

International Search Report from PCT Application No. PCT/IB2017/053149, dated Oct. 9, 2017.

\* cited by examiner

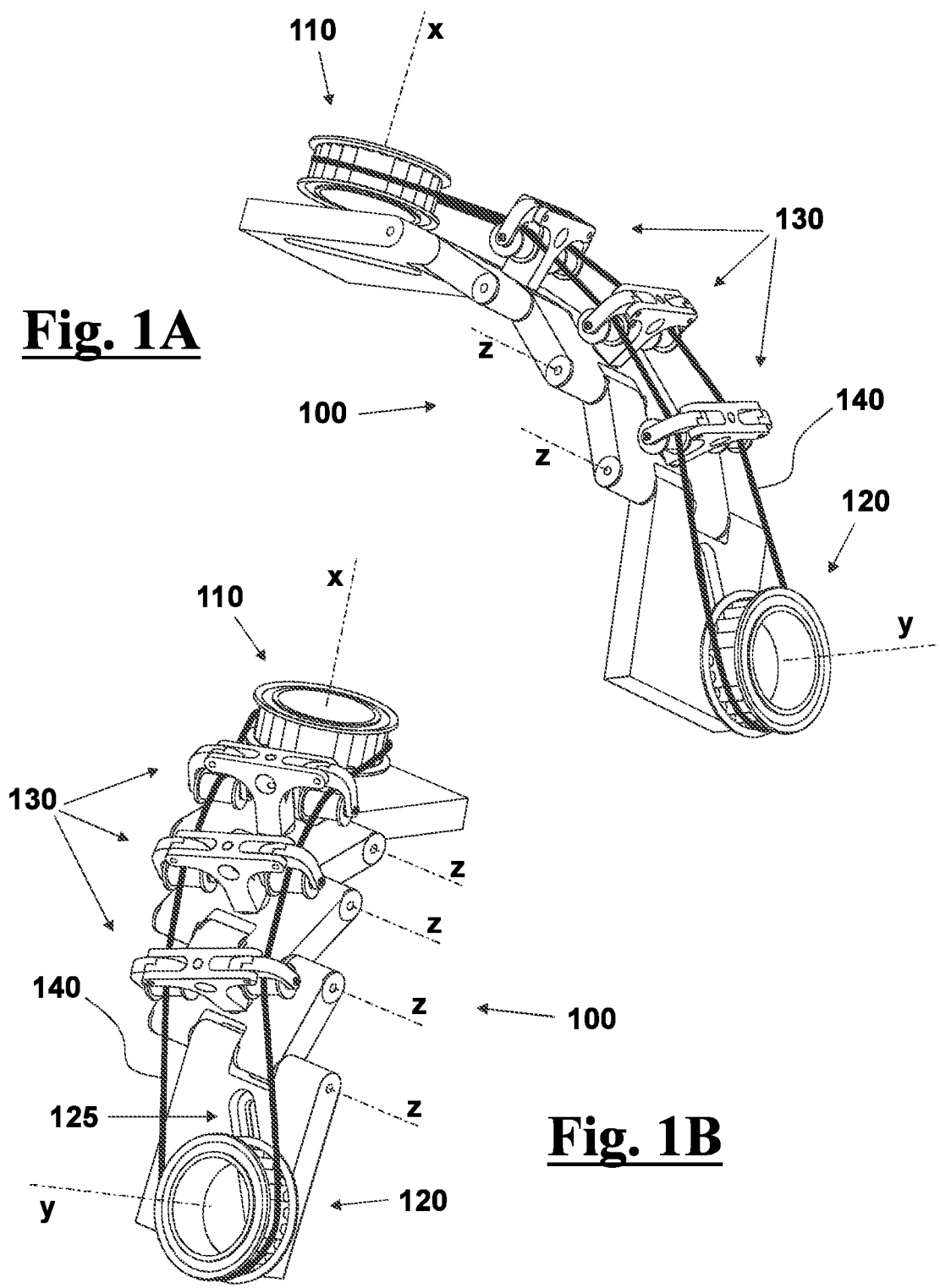

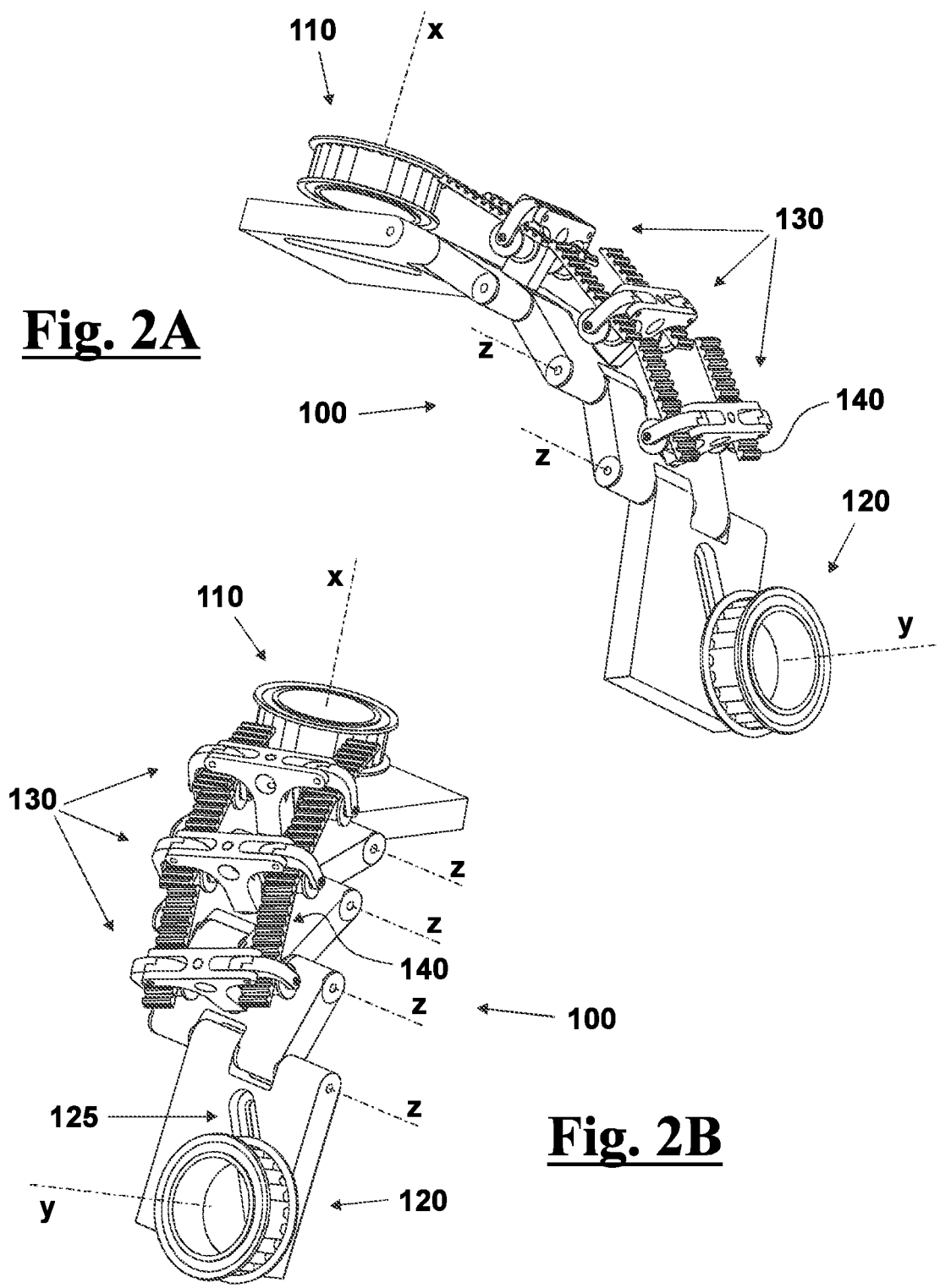

KINEMATIC CHAIN FOR TRANSMISSION OF MECHANICAL TORQUES

FIELD OF THE INVENTION

The present invention relates to the field of kinematic chains.

In particular, the invention relates to the field of transmission of torques between two rotating elements rotating having rotation axes with any relative orientation.

DESCRIPTION OF THE PRIOR ART

In the scope of the kinematic transmission of motion, one of the most important technical problems concerns the transmission of a torque between rotating elements rotating spaced from each other and having rotation axes not parallel to each other.

In this situation, in fact, it is not possible to use neither the traditional belts, which require rotation axes parallel to each other, nor gears or rotational constraints, which require the proximity between the rotating elements.

To give rise to this motion transmission, therefore, two types of solution are usually used.

A first solution consists in the combined use of pulleys arranged in series along the path between the active rotational element and the passive one. The motion is transmitted by means of cables that bring in rotation the pulleys owing to the rolling friction at the contact points. This is for example the way to work of a cableway. Such system has a good efficiency in transmitting the motion and allows a big range of the rotation, but is very stiff and not adaptable to systems where the rotating elements have to change orientation of its own rotation axis for adapting to different applications or different phases of the motion.

A second solution consists in the use of "bowden cable" that allow to transmit both translational motions and rotational ones, and that especially can be easily adapted to any path of motion transmission and at any change of direction of the rotational axes. Such solution, by contrast, with respect to the pulleys located in series, does not allow a big range of the rotation, since the inner cable cannot slide beyond a certain amount with respect to the external sheath. Furthermore, the frightening friction between cable and sheath reduces the efficiency of the motion transmission with respect to the previous solution.

Therefore, in prior art one or the other type of solution is used depending on the specific need, but both involve considerable disadvantages.

In the field of robotics, for example, would be extremely useful a transmission system of the motion that has both a good efficiency of transmission, both a good adaptation to a non-predetermined path of transmission and to a non-predetermined orientation of the rotation axes.

U.S. Pat. No. 5,447,403 describes an anthropomorphic robotic arm that can be controlled by an operator in remote. The operation of the fingers of the hand, in particular, is ensured through a plurality of cables and pulleys that allow the relative rotation between the phalanges in the flexion/extension plane, simulating the function of the anatomical tendons. In this system, therefore, the motion transmission between the end pulleys is not an end to itself, but is aimed at producing a change in the position of the intermediate elements, i.e. the phalanxes. Furthermore, the rotation of the pulleys that allows transmitting the motion is carried out about axes parallel to each other and parallel to the rotation axes of the end pulleys. Therefore, this system does not allow nor to model neither to fasten the path along which is carried out the torque transmission.

SUMMARY OF THE INVENTION

It is therefore a feature of the present invention to provide a kinematic chain that allows the transmission of a rotational motion between an active rotating element and a passive rotating element remotely located and having axes with any relative orientation.

It is also a feature of the present invention to provide such a kinematic chain that allows the transmission of a rotational motion between an active rotating element and a passive rotating element having rotation axes with adjustable orientation.

It is still a feature of the present invention to provide such a kinematic chain that allows the transmission of a rotational motion through a transmission element whose path is not straight.

It is another feature of the present invention to provide such a kinematic chain that allows the transmission of a rotational motion mainly by means of rolling friction.

It is a further feature of the present invention to provide such a kinematic chain that is modular, versatile and lightweight in order to adapt to different uses.

These and other objects are achieved by a kinematic chain comprising:
- a first pulley arranged to rotate about a rotation axis x;
- a second pulley arranged to rotate about a rotation axis y;
- at least one connecting element comprising at least one passage having at least one rotating element, said or each connecting element also comprising at least one interface arranged to connect the connecting element to an adjacent connecting element or to a pulley, generating a rotational constraint about a rotation axis z;
- an transmission element which is adapted to evolve along a determined path for transmitting a rotational motion between the first pulley and the second pulley;
- whose characteristic is that it is arranged to pass between an adjusting configuration, wherein said or each connecting element is adapted to rotate about its rotation axis z for adjusting its own angular position with respect to an adjacent connecting element or to a pulley, and a transmission configuration, wherein, when the first pulley rotates about its rotation axis x, the second pulley rotates proportionally about its rotation axis y, and that in the transmission configuration said or each connecting element is adapted to not rotate about its rotation axis z.

Advantageously, the transmission element is adapted to be, in said transmission configuration, fixedly in contact with said or each rotating element by means of a rolling friction, in order to allow a modelling of the determined path according to a predetermined geometry.

In particular, each rotation axis z can be suitably oriented in such a way that you have the desired relative orientation between the rotation axis x and the rotation axis y.

The present invention, then provides a transmission of the mechanical torque between two pulleys having any relative orientation, through a path having predetermined geometry and with high efficiency due to a transmission of the motion mainly by means of rolling friction.

Advantageously, the position of the pulleys can be slightly shifted, in order to preload the transmission element and to maintain it always in tension.

In particular, said or each connecting element comprises a first interface and a second interface, said interface comprising alternatively:
- a first protrusion;
- a first protrusion and a second protrusion;
- a first protrusion and a second protrusion and a third protrusion;
- a combining the previous;
- said protrusions arranged to create hinge constraints between the connecting element and an adjacent connecting element or between the connecting element and a pulley.

In particular, the rotation axes z of the two interfaces cannot be parallel to each other, i.e. incident or not of the same plane, in order to allow higher freedom in the path geometry followed by the kinematic chain.

Advantageously, the transmission element is a cable with circular cross section. The cable can either be full (e.g. nylon wire), or a strand (e.g. a plot of many cables of steel, nylon and/or generally each type of fibre). This way, a good bending of the transmission element is allowed even while providing sufficient tensile strength.

Alternatively, the transmission element is a flat belt or a toothed belt.

The toothed belt works engaging the inlet and outlet pulleys, whereas the flat belt works by means of friction with the inlet and outlet pulleys. With respect to the cable, the belt is much stronger and does not exhibit phenomena of relative sliding of the filaments inside the strand caused by traction.

Advantageously, the passage comprises 3 rotating elements for any relative orientation between two connecting elements adjacent maintaining the cable always adhesive to the rotating elements.

In particular, said or each connecting element comprises two passages. This way, the transmission element can slide both in a direction and in the other, facilitating the transmission of the torque when the angular excursion is higher than the circumference of the drive pulley.

Advantageously, lock means are provided arranged to block the relative position between two adjacent connecting elements or between a connecting element and a pulley.

In particular, the lock means is actuated by an actuator. Such actuator can, for example, be located at the rotational joint between two adjacent connecting elements.

Advantageously, the lock means comprises tie rods and/or struts arranged to avoid the variation of distance between two passages of two adjacent connecting elements or between a connecting element and a pulley.

According to another aspect of the invention, a system comprises at least two kinematic chains, according to the present invention, wherein a first pulley of a first kinematic chain is located in rotational connection with at least one second pulley of a second kinematic chain.

This way, you can create a kinematic chain that is sum of more chains arranged in series and/or in parallel to each other, transmitting the rotational motion from pulley to pulley and from chain to chain.

BRIEF DESCRIPTION OF THE DRAWINGS

Further characteristic and/or advantages of the present invention are more bright with the following description of an exemplary embodiment thereof, exemplifying but not limitative, with reference to the attached drawings in which:

FIGS. 1A and 1B show from different perspectives a first embodiment of the kinematic chain, according to the present invention, where the transmission element is a cable;

FIGS. 2A and 2B show from different perspectives a second embodiment of the kinematic chain, according to the present invention, where the transmission element is a belt;

DESCRIPTION OF A PREFERRED EXEMPLARY EMBODIMENT

Figure 3A:
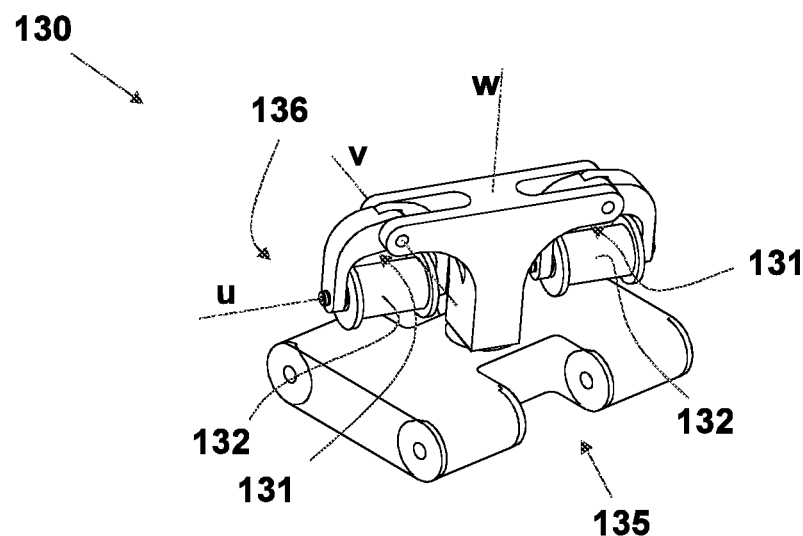
FIGS. 3A and 3B show from different perspectives a first embodiment of the connecting element.

With reference to FIGS. 1A, 1B, 2A and 2B, the kinematic chain 100, according to the present invention, comprises a first pulley 110, arranged to rotate about a rotation axis x, and a second pulley 120, arranged to rotate about a rotation axis y.

The chain 100 also comprises a plurality of connecting elements 130 and a transmission element 140 arranged to transmit a rotational motion between the first pulley 110 and the second pulley 120.

Figure 3B:
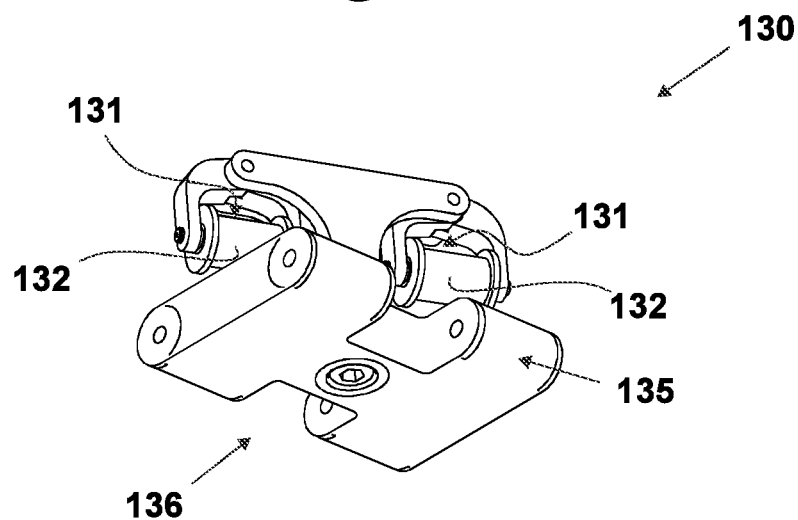

With reference even at FIGS. 3A and 3B, the connecting element 130 comprises two passages 131 having each a rotating element 132. In particular, the transmission element 140 is adapted to be, in use, fixedly in contact with the rotating elements 132 by a constraint of rolling friction, in order to transmit the rotational motion as efficiently as possible.

Furthermore, with reference to FIG. 3A, the rotating elements 132 have 3 degrees of freedom with respect to the interface 135 and 136 of the connecting element 130. In particular, the rotating element 132, in addition to rotating about its own axis u, can also rotate about axes v and w. This allows the rotating element 132, and therefore the passage 131, to move freely, in order to allow a transmission element 140 to follow a determined path according to a predetermined geometry, without ever losing contact with the rotating element 132 itself.

More in particular, each connecting element 130 comprises two interfaces 135 and 136 arranged to connect to each other adjacent connecting elements 130 by means of rotational constraints having rotation axis z not necessarily parallel either to said rotation axis x or to said rotation axis y. In particular, in this embodiment, the axes z are orthogonal to both the axes x and y.

This way, it is possible to transfer a rotational motion between two rotating elements with rotation axes having any relative orientation and through a trajectory that is easily adaptable to different encumbrance requirements.

Such solution is particularly advantageous in the field of robotics, and in particular in the application to wearable exoskeletons, for which it is essential transmitting torques by a light transmission means, not bulky and adaptable to complex trajectories.

Furthermore, in this exemplary embodiment a preload slot 125 is provided for translating the pulley 120, in order to preload the transmission element and maintaining it always in tension.

In particular, in FIGS. 1A and 1B a first exemplary embodiment is shown of the kinematic chain 100, where the transmission element 140 consists of a cable with circular cross section. Such solution allows a greater adaptability of the trajectory of the transmission element 140, since it is allowed to inflect and curve it.

In the FIGS. 2A and 2B instead a second exemplary embodiment is shown, where the transmission element 140 consists in a flat or toothed belt, which has greater tensile strength than the cable, but allows less freedom of movement of the kinematic chain. In this case, it is particularly effective the embodiment of the connecting element 130 shown in FIGS. 3A and 3B, since the belt having rectangular cross section is particularly adapted to the shape of the element rotating 132.

Figure 4A:
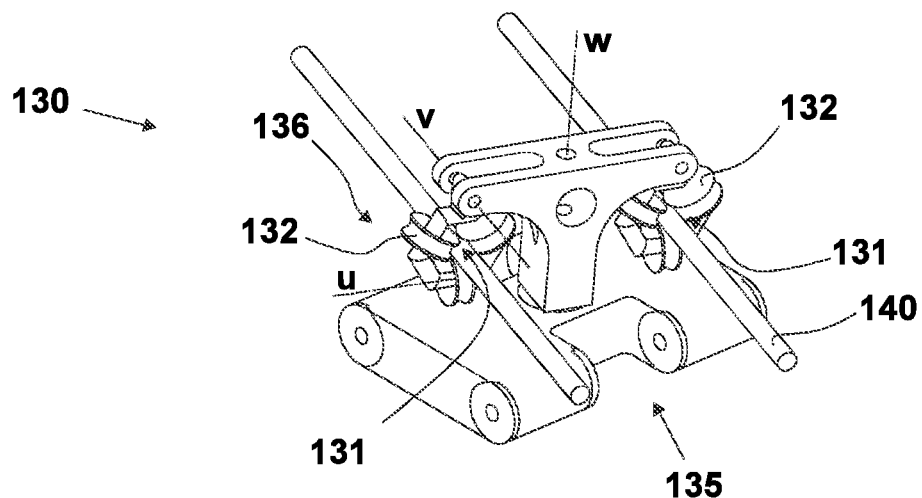
FIGS. 4A and 4B show from different perspectives a second embodiment of the connecting element.
Figure 4B:
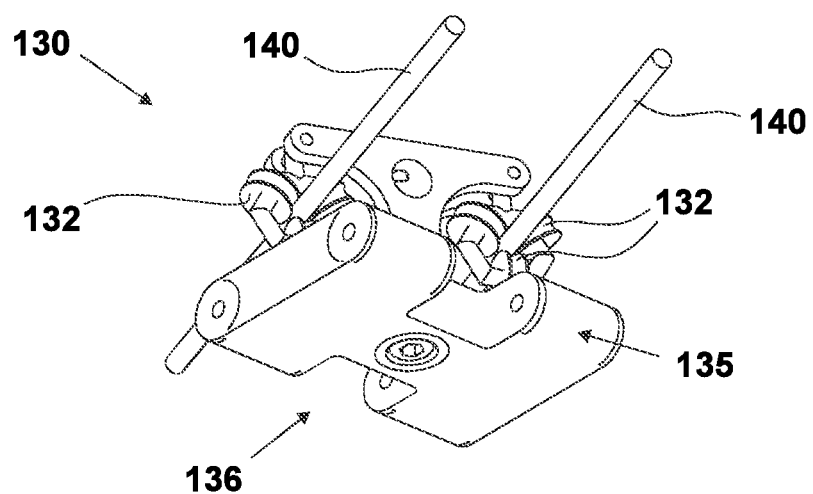

In the FIGS. 4A and 4B, instead, an embodiment of the connecting element 130 is shown which is particularly suitable for the use of the cable with circular cross section as transmission element 140. In this exemplary embodiment, in fact, 3 rotating elements 132 are provided arranged at 120° in order to create between them the passage 131 where the cable 140 is constrained to pass. This particular configuration allows the cable 140 to have a lot of freedom of movement with respect to the connection element 130, while remaining in contact with all three the rotating elements 132. This allows to vary the geometry of the path followed by the cable 140, allowing a great adaptability of the kinematic chain 100.

Figure 5A:
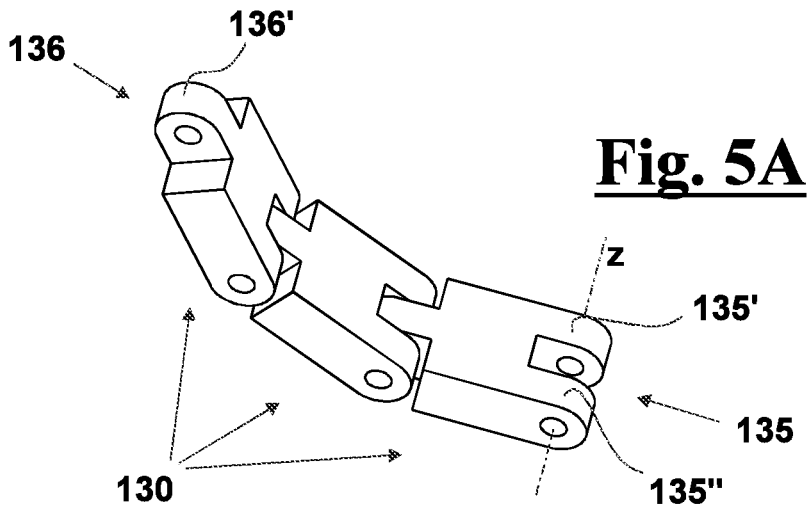
FIGS. 5A, 5B and 5C show three embodiments of the interface of the connecting element.
Figure 5B:
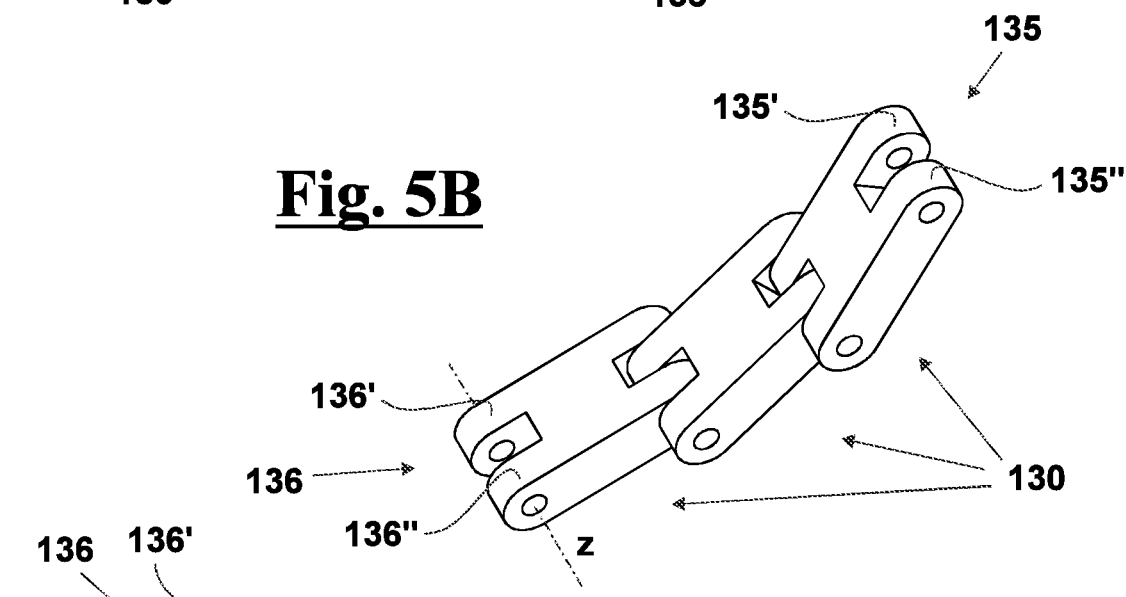
Figure 5C:
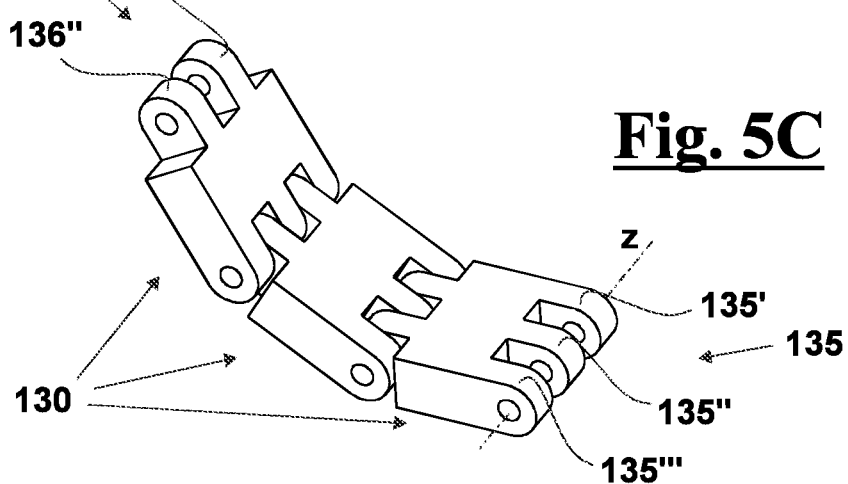

In the FIGS. 5A, 5B and 5C three exemplary embodiments of the interfaces 135 and 136 of the connecting elements 130 are shown.

In particular, the embodiment in FIG. 5A provides that the interface 136 has a protrusion 136' and the interface 135 has the protrusions 135' and 135". This way, the concatenation of connecting elements 130 takes place along a trajectory belonging to a plane orthogonal to rotation axes z.

The exemplary embodiment of FIG. 5B instead provides that both interfaces 135 and 136 have two protrusions, respectively 135',135" and 136',136". Thus, the concatenation of the connecting elements 130 takes place in a staggered way, generating a three-dimensional curve that can be adapted to a desired profile, such as a spiral or a helix. Such configuration is useful in case, for example, the chain 100 has to follow a trajectory around a robotic or human limb.

The exemplary embodiment of FIG. 5C, finally, has on one side the 2 protrusions 136' and 136" and on the other side the 3 protrusions 135', 135" and 135'", allowing to give rise, depending on the need, to both the configurations of the embodiments of FIGS. 5A and 5B.

Figure 6A:
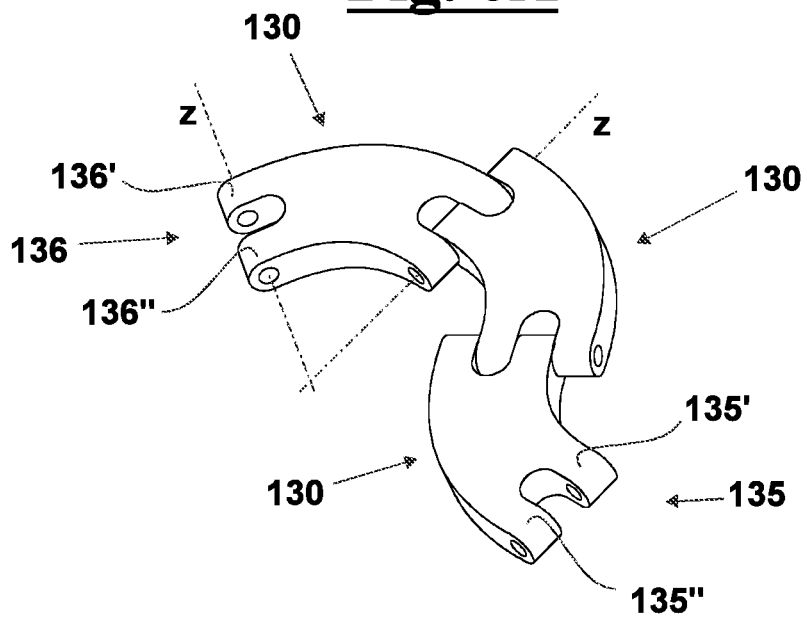
FIGS. 6A and 6B show two embodiments of the connecting element.
Figure 6B:
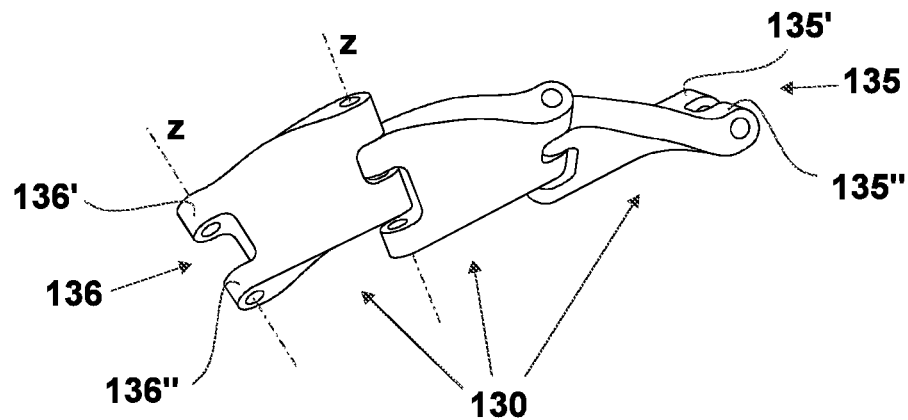

In the FIGS. 6A and 6B two further exemplary embodiments of the interface 135 and 136 of the connecting elements 130 are shown, where the rotation axes z are, respectively, incident and not belonging to the same plane, instead of being parallel as in FIGS. 5A, 5B and 5C. This allows to further vary the geometry of the kinematic chain 100 to pleasure.

Figure 7A:
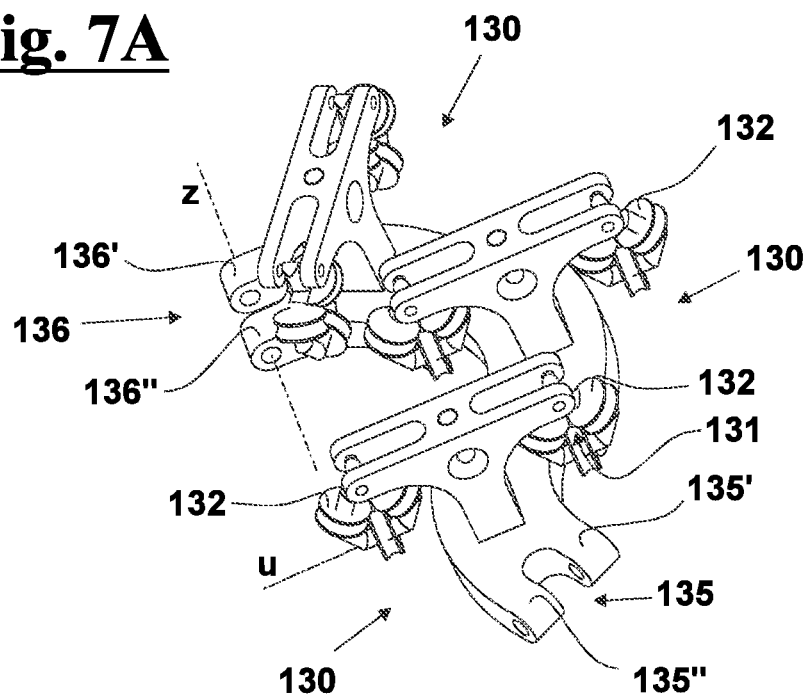
FIGS. 7A and 7B show the embodiments of FIGS. 6A and 6B comprising also the rotating elements.
Figure 7B:
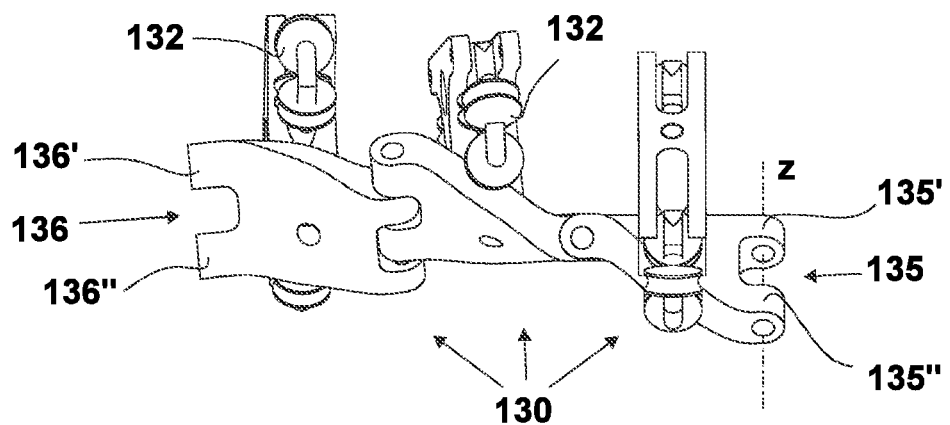

In the FIGS. 7A and 7B shows the embodiments of FIGS. 6A and 6B comprising also the rotating elements 132.

Owing to the modularity and to the versatility of the connecting elements 130, therefore, the present invention provides a kinematic chain capable to transmit a torque in an extremely adaptable manner to the most various conditions of encumbrance, weight, obstacles and geometry of the support.

Figure 8A:
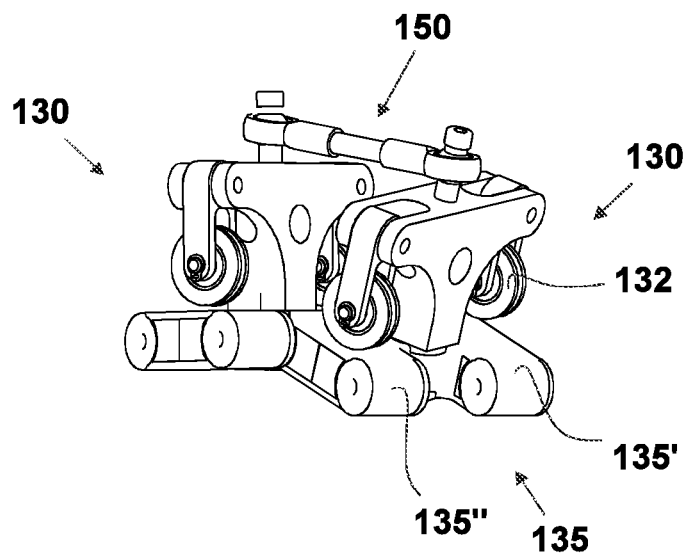
FIGS. 8A and 8B show a possible embodiment of the lock means.
Figure 8B:
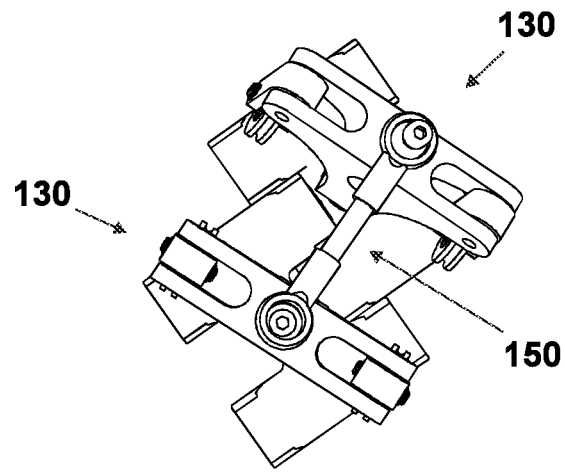

FIGS. 8A and 8B show a possible exemplary embodiment of the lock means 150. In particular, in this embodiment, the connecting elements 130 comprise tie rods and/or struts 150 available, manually or in an actuated manner, to a determined length. Such tie rods and/or struts are adapted to keep fixed this distance, in such a way that, in the transmission configuration the connecting elements 130 do not rotate relatively to each other and remain on the trajectory established in the adjusting configuration.

Alternatively, the lock means 150 can comprise bolts arranged, by friction, to block the relative position between the protrusions of a first connecting element 130 with the protrusions of an adjacent element 130.

The foregoing description some exemplary specific embodiments will so fully reveal the invention according to the conceptual point of view, so that others, by applying current knowledge, will be able to modify and/or adapt in various applications the specific exemplary embodiments without further research and without parting from the invention, and, accordingly, it is meant that such adaptations and modifications will have to be considered as equivalent to the specific embodiments. The means and the materials to realise the different functions described herein could have a different nature without, for this reason, departing from the field of the invention. it is to be understood that the phraseology or terminology that is employed herein is for the purpose of description and not of limitation.

The invention claimed is:

1. A kinematic chain comprising:
a first pulley arranged to rotate about a rotation axis x;
a second pulley arranged to rotate about a rotation axis y;
at least one connecting element comprising at least one passage connecting to the first and second pulleys;
a transmission element arranged to move along a determined path for transmitting a rotational motion between said first pulley and said second pulley, said transmission element arranged to pass through the at least one passage;
wherein said kinematic chain is arranged to pass between an adjusting configuration, wherein the at least one connecting element is adapted to rotate about a rotation axis z for adjusting its own angular position, and a transmission configuration, wherein, when said first pulley rotates about said rotation axis x, said second pulley rotates proportionally about said rotation axis y, wherein the at least one connecting element is adapted to not rotate about said rotation axis z in said transmission configuration.

2. The kinematic chain according to claim 1, wherein the at least one connecting element includes at least one interface arranged to connect to the at least one connecting element to an adjacent connecting element or to at least one of said first and second pulleys, generating a rotational constraint about the rotation axis z.

3. The kinematic chain according to claim 1, wherein said transmission element is a cable with circular cross section.

4. The kinematic chain according to claim 1, wherein said transmission element is a flat belt or a toothed belt.

5. The kinematic chain, according to claim 1, wherein each at least one connecting element has at least one rotating element having a rotation axis u located at least in part in said at least one passage.

6. The kinematic chain according to claim 5, wherein said at least one passage comprises at least two rotating elements arranged to allow any relative orientation between two adjacent connecting elements maintaining said transmission element in contact with said rotating elements.

7. The kinematic chain according to claim 1, wherein the at least one connecting element comprises at least two passages.

8. The kinematic chain according to claim 1, further comprising a lock device arranged to block a relative position between first and second connecting elements of said at least one connecting element, or between the first connecting element and one of the first and second pulleys.

9. The kinematic chain according to claim 8, wherein the lock device comprises at least one tie rod adapted to maintain a fixed distance between the first and second opposed connecting elements, in the transmission configuration the first and second connecting elements do not rotate relatively to each other and remain on a trajectory established in the adjusting configuration.

10. The kinematic chain according to claim 9, wherein the at least one tie rod is actuated by an actuator.

11. The kinematic chain according to claim 8, wherein said lock device comprises tie rods and/or struts arranged to avoid the variation of distance between two passages of the first and second connecting elements or between a connecting element and the first connecting element and one of the first and second pulleys.

12. A system comprising at least two kinematic chains, wherein each kinematic chain comprises:
a first pulley arranged to rotate about a rotation axis x;
a second pulley arranged to rotate about a rotation axis y;
at least one connecting element comprising at least one passage connecting to the first and second pulleys;
a transmission element arranged to move along a determined path for transmitting a rotational motion between said first pulley and said second pulley, said transmission element arranged to pass through the at least one passage;
wherein said kinematic chain is arranged to pass between an adjusting configuration, wherein the at least one connecting element is adapted to rotate about a rotation axis z for adjusting its own angular position, and a transmission configuration, wherein, when said first pulley rotates about said rotation axis x, said second pulley rotates proportionally about said rotation axis y,
wherein the at least one connecting element is adapted to not rotate about said rotation axis z in said transmission configuration;
wherein a first pulley of a first kinematic chain is located in rotational connection with at least one second pulley of a second kinematic chain.

13. A kinematic chain comprising:
a first pulley arranged to rotate about a rotation axis x;
a second pulley arranged to rotate about a rotation axis y;
at least one connecting element comprising at least one passage connecting to the first and second pulleys;
a transmission element arranged to move along a determined path for transmitting a rotational motion between said first pulley and said second pulley, said transmission element arranged to pass through the at least one passage;
wherein said kinematic chain is arranged to pass between an adjusting configuration, wherein the at least one connecting element is adapted to rotate about a rotation axis z for adjusting its own angular position, and a transmission configuration, wherein, when said first pulley rotates about said rotation axis x, said second pulley rotates proportionally about said rotation axis y,
wherein the at least one connecting element is adapted to not rotate about said rotation axis z in said transmission configuration;
wherein the at least one connecting element has at least one rotating element having a rotation axis u located at least in part in said at least one passage;
wherein said rotation axis u is adapted to rotate with respect to said rotation axis z, in order to allow modelling said determined path according to a predetermined geometry;
wherein the at least one connecting element includes at least one interface arranged to connect the at least one connecting element to at least one of said first and second pulleys, generating a rotational constraint about the rotation axis z.

14. The kinematic chain according to claim 13, wherein said transmission element is a cable with circular cross section.

15. The kinematic chain according to claim 13, wherein said transmission element is a flat belt or a toothed belt.

16. The kinematic chain according to claim 13, wherein said at least one passage comprises at least two rotating elements arranged to allow any relative orientation between two adjacent connecting elements maintaining said transmission element always in contact with said rotating elements.

17. The kinematic chain according to claim 13, wherein the at least one connecting element comprises at least two passages.

18. The kinematic chain according to claim 13, further comprising a lock device arranged to block a relative position between first and second connecting elements of said at least one connecting element, or between the first connecting element and one of the first and second pulleys.

19. The kinematic chain according to claim 18, wherein the lock device comprises at least one tie rod adapted to maintain a fixed distance between the first and second opposed connecting elements, in the transmission configuration the first and second connecting elements do not rotate relatively to each other and remain on a trajectory established in the adjusting configuration.

* * * * *